United States Patent Office 2,835,189
Patented May 20, 1958

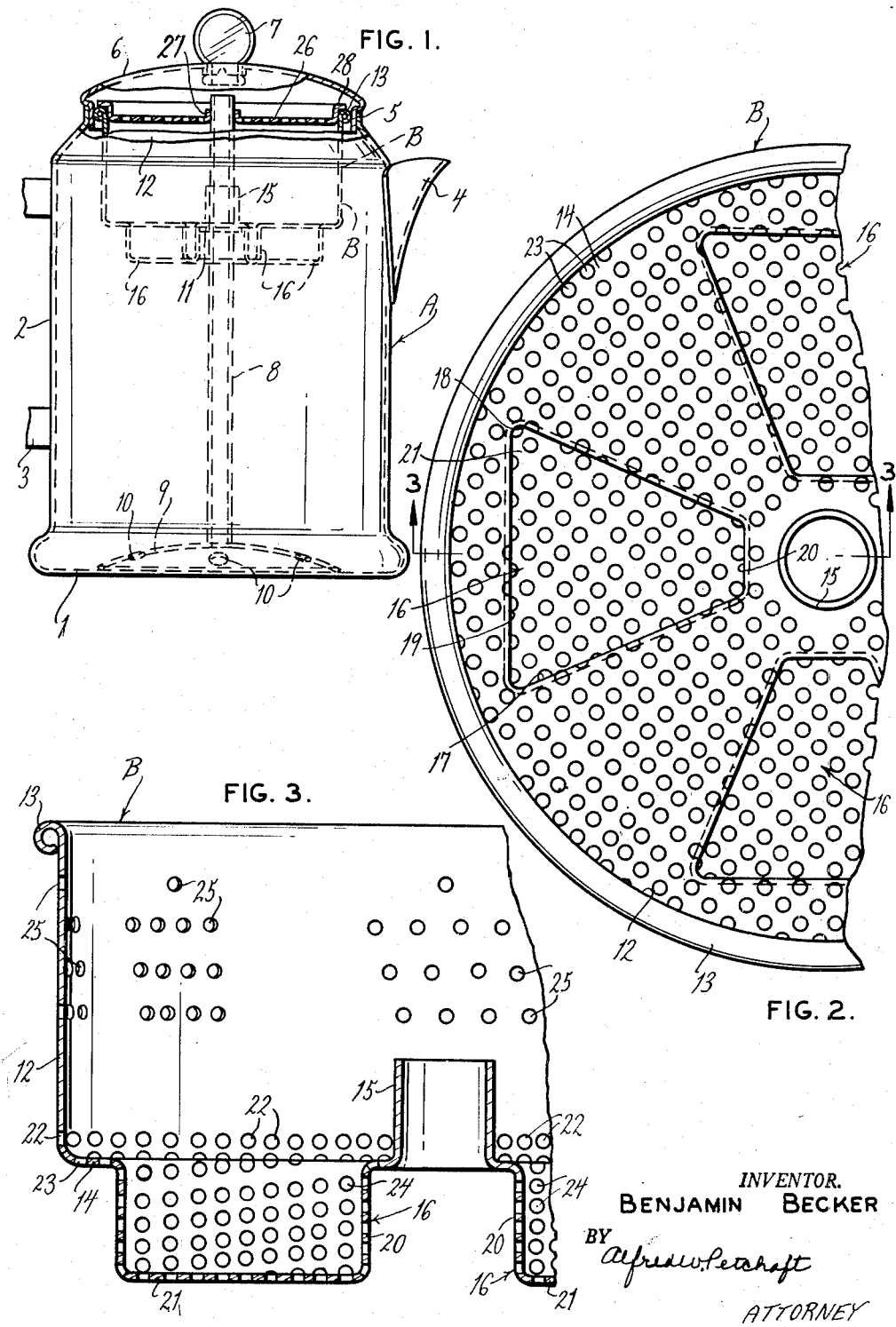

2,835,189

MEANS FOR BREWING COFFEE

Benjamin Becker, St. Louis, Mo.

Application April 2, 1953, Serial No. 346,397

2 Claims. (Cl. 99—310)

This invention relates in general to certain new and useful improvements in methods and means for brewing coffee and, more particularly, to an improved coffee percolator.

It is the primary object of the present invention to provide a new and improved method and means for brewing coffee which will produce a potable beverage of improved flavor and aroma.

It is another object of the present invention to provide method and means of the type stated for brewing coffee having improved body and unusual freedom from sedimentation.

It is a further object of the present invention to provide method and means for brewing coffee more economically and efficiently, that is to say method and means for obtaining a greater and more flavorful yield of beverage from a given quantity of ground coffee.

With the above and other objects in view, my invention resides in the novel features of form, construction, arrangement, and combination of parts presently described and pointed out in the claims.

In the accompanying drawing (one sheet)—

Figure 1 is a side elevational view, partly broken away and in section, of a new and improved coffee percolator constructed in accordance with and embodying the present invention;

Figure 2 is a fragmentary top plan view of a percolator basket forming a part of the present invention; and Figure 3 is a fragmentary vertical sectional view of the percolator basket shown in Figure 2.

Referring now in more detail and by reference characters to the drawing, which illustrates a preferred embodiment of the present invention, A designates a coffee pot having the form and shape of a conventional percolator and integrally including a flat bottom wall 1 and an upwardly extending or vertical cylindrical side wall 2 provided on one side with a conventional handle 3 and in diametrally opposed relation thereto with a conventional pouring spout 4. At its upper end, the side wall 2 terminates in an upstanding rim 5 forming a top opening for receiving a shallow dome-like closure-forming lid 6 centrally provided with a hollow spherical glass knob 7. Disposed within the pot A is a vertical percolator tube 8 provided at its lower end with an upwardly dished bottom disk 9 having a plurality of apertures 10 by which the liquid within the pot A may circulate into the lower end of the percolator tube 8. The percolator tube 8 extends upwardly through the pot A and terminates just beneath the downwardly opening lower end of the knob 7. In downwardly spaced relation to its upper end, the percolator tube 8 is provided with a diametrally enlarged bead 11 for supporting engagement with the percolator basket B, as best seen in Figure 1.

The percolator basket B comprises a cylindrical side wall 12 which is curled over around its upper periphery in the formation of a top bead or rim 13, the outside diametral size of which is such that it will fit more or less snugly within the confines of the lid 6, as shown in Figure 1. At its lower margin, the side wall 2 is integrally provided with a transversely extending horizontal bottom wall 14 which is, in turn, integrally provided with an upwardly projecting short sleeve 15 co-axial with the cylindrical side wall 12 and sized for slip-fitted engagement around the upper portion of the percolator tube 8. The bottom wall 14 is, furthermore, provided with a plurality of uniformly spaced, downwardly pressed pockets 16, each integrally including side walls 17, 18, which are located in radial planes with respect to the vertical center line of the cylindrical side wall 12. The pockets 16 are, furthermore, provided with end walls 19, 20, which are preferably perpendicular to a radial line lying midway between the side walls 17, 18. The walls 17, 18, 19, are integrally connected along their lower margins with a flat horizontal bottom wall 21.

The percolator basket B is provided adjacent its bottom wall 14 with a single line of closely spaced perforations or apertures 22 and the entire area of its bottom wall is provided with an entire series of similar closely spaced apertures 23. Finally, the side walls 17, 18, end walls 19, 20, and bottom wall 21 of each of the pockets 16 are provided over their entire areas with similar closely spaced small apertures 24. The side wall 12 of the basket B is relatively solid and is only perforated with a plurality of groups of small apertures 25 arranged in three spaced parallel lines of four each. The apertures in each line being laterally offset with reference to the corresponding apertures 25 directly above and below, so that within each group no aperture 25 is directly above any other aperture 25, as best seen in Figure 3.

Preferably, the percolator basket B is provided with a circular foraminous cover element 26 which is marginally provided with a spun flange 27 and lip 28 for loosely seated engagement on the rim 13, as best seen in Figure 1.

The volumetric size of the pockets 16 is such that when the pot A is filled with the maximum quantity of water for its capacity, that is to say up to a level just below the lower limits of the spout 4, the necessary amount of ground coffee for such quantity of water will fill the lower portion of the percolator basket B and will reach up to a level somewhere below the plane of the upper end of the sleeve 15. In other words, each of the pockets 16 will be completely filled with ground coffee and a relatively thin layer of ground coffee will extend over the bottom wall 14 covering the apertures 22.

If a smaller quantity of coffee is desired, it will, of course, be obvious that less water will be placed in the pot A and less ground coffee will be placed in the basket B, in which case all of the coffee will be distributed in and contained entirely by the pockets 16. When properly filled with water and ground coffee, the pot A is placed upon the stove in the conventional manner and the water brought to a boil. As the water reaches boiling temperature, it will rise up through the percolator tube 8 and gurgle into the interior of the percolator basket B. At the same time, the heated water vapor or steam and some of the hot water as a result of surface ebullition will permeate the percolator basket B directly through the apertures 24, 25, and will subject the ground coffee to a certain amount of steam distillation and direct extraction in addition to the normal leaching action of the hot water which circulates down from the top of the tube 8. The water and steam which are thus brought to bear upon the separate and compartmentalized quantities of ground coffee within the pockets 16 will extract the coffee juice much more efficiently and with a markedly reduced extraction of flavor-spoiling rancidifiable oils and other off-flavor ingredients. Furthermore, the resulting beverage is much more nearly a true solution and contains less sediment-producing solid fines.

Finally, the coffee which is brewed in accordance with the present invention is of much improved flavor, clarity, color, body and aroma and will retain its potability over much longer periods of time without developing an off-flavor.

It has also been found in connection with the present invention that it is possible to brew a strong, well flavored beverage more economically, that is to say with a relatively smaller quantity of ground coffee per cup.

It should be understood that changes and modifications in the form, construction, arrangement, and combination of the several parts of the percolator and in the method of brewing coffee therewith may be made and substituted for those herein shown and described without departing from the nature and principle of my invention.

Having thus described my invention, what I claim and desire to secure by Letters Patent is:

1. A coffee percolator comprising a pot having a removable lid, a percolator tube extending vertically through the pot, and a percolator basket mounted upon said tube, said percolator basket having a cylindrical circumferentially extending substantially vertical side wall provided with annularly spaced groups of apertures, said apertures in each group being arranged in a plurality of vertically spaced lines with the apertures of each line staggered in relation to the apertures of the other lines, said basket further having a flat bottom wall provided with a plurality of depending pockets having substantially vertical side walls which lie in planes extending radially from the center of said basket, said pockets also having side walls perpendicular to said planes so that the pockets are of trapezoidal cross-section, said pockets furthermore having substantially horizontal bottom walls, said side walls and bottom walls being provided with a plurality of apertures.

2. A coffee percolator comprising a pot having a removable lid, a percolator tube extending vertically through the pot, and a percolator basket mounted upon said tube, said percolator basket having a cylindrical circumferentially extending substantially vertical side wall provided with annularly spaced groups of apertures, said apertures in each group being arranged in a plurality of vertically spaced lines with the apertures of each line staggered in relation to the apertures of the other lines, said vertically side wall also having a line of apertures adjacent its lower margin, said basket further having a flat bottom wall provided with a plurality of depending pockets having substantially vertical side walls which lie in planes extending radially from the center of said basket, said pockets also having side walls perpendicular to said planes so that the pockets are of trapezoidal cross-section, said pockets furthermore having substantially horizontal bottom walls, said side walls and bottom walls being provided with a plurality of apertures.

References Cited in the file of this patent

UNITED STATES PATENTS

| | | |
|---|---|---|
| 427,568 | Halstead | May 13, 1890 |
| 1,297,425 | Wentorf | Mar. 18, 1919 |
| 1,309,414 | Huning | July 8, 1919 |
| 1,431,603 | Sprague | Oct. 10, 1922 |
| 1,740,136 | Aborn | Dec. 17, 1929 |
| 1,778,792 | Cameron | Oct. 21, 1930 |
| 2,020,104 | Collins | Nov. 5, 1935 |
| 2,295,433 | Steinmetz | Sept. 8, 1942 |
| 2,491,336 | Scherck | Dec. 13, 1949 |

FOREIGN PATENTS

| | | |
|---|---|---|
| 385,230 | France | Mar. 7, 1908 |
| 429,600 | Great Britain | June 4, 1935 |